April 12, 1932. R. V. PROCTOR 1,853,224
TUNNEL LINING FOR WITHSTANDING INTERNAL PRESSURE
Filed Feb. 14, 1931 2 Sheets-Sheet 1
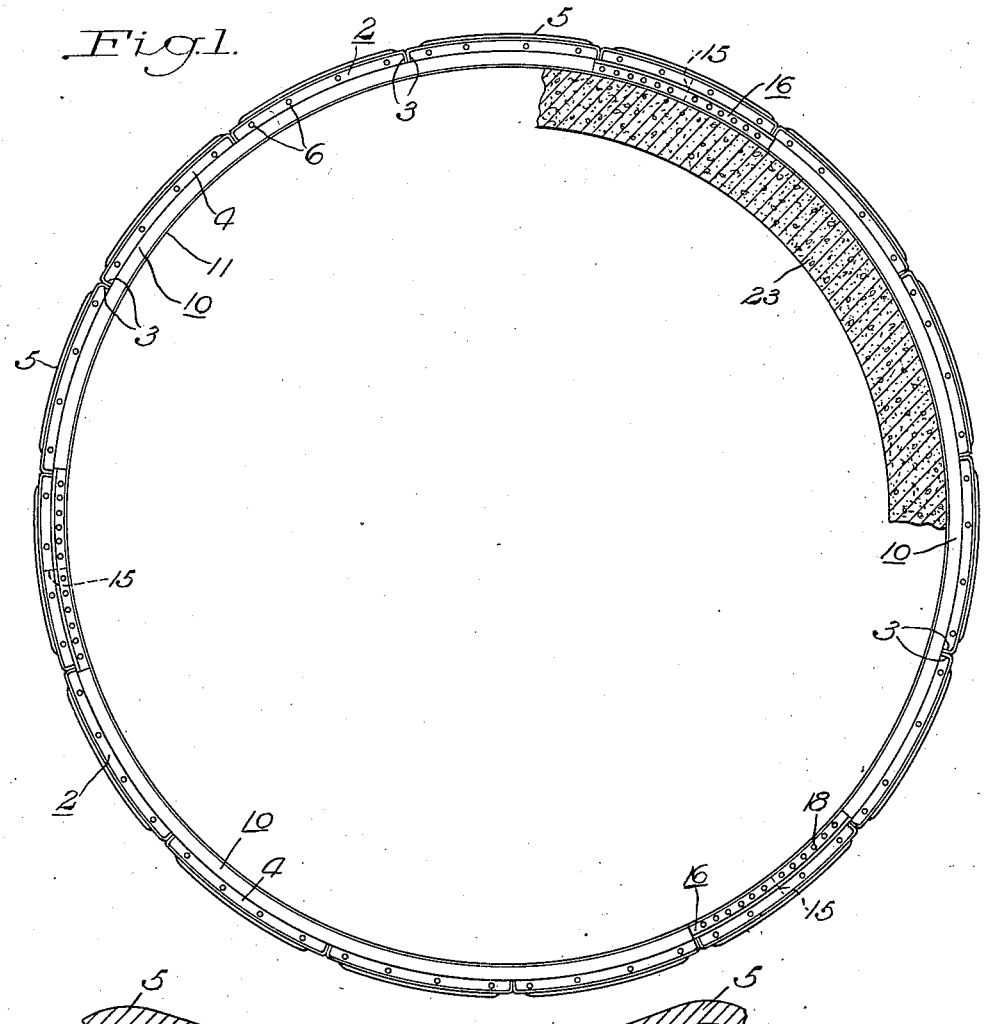
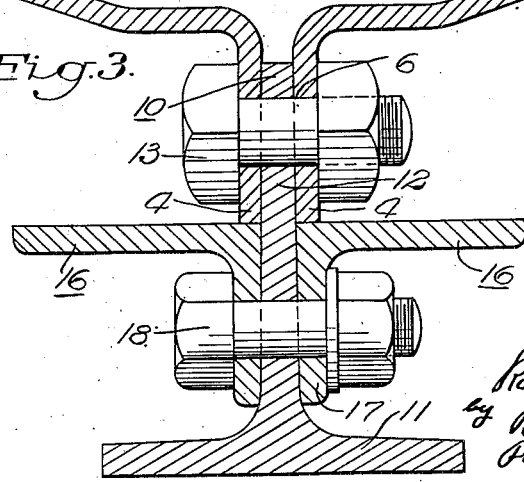
INVENTOR

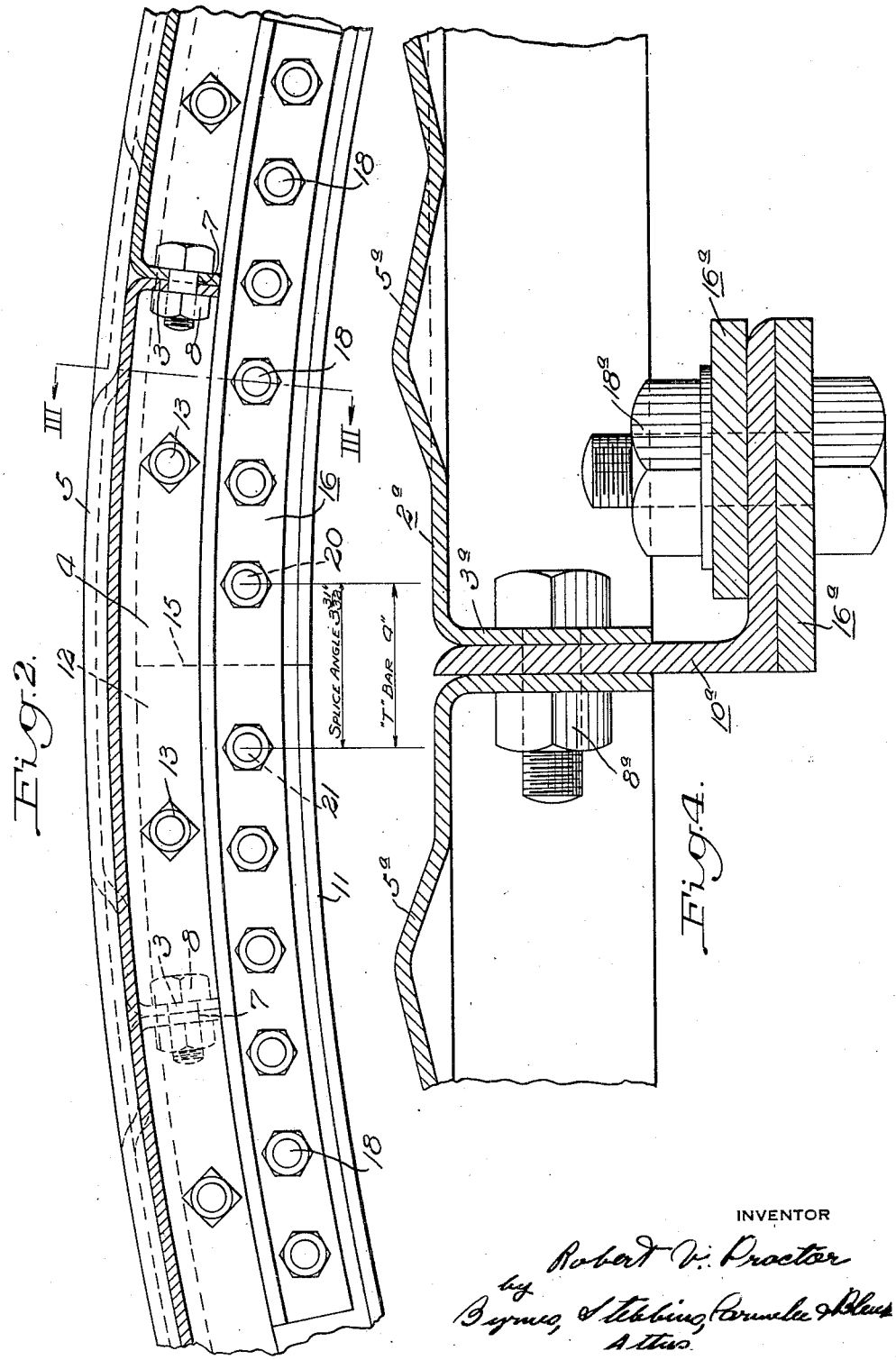

Patented Apr. 12, 1932

1,853,224

UNITED STATES PATENT OFFICE

ROBERT V. PROCTOR, OF YOUNGSTOWN, OHIO, ASSIGNOR TO THE COMMERCIAL SHEARING & STAMPING COMPANY, OF YOUNGSTOWN, OHIO, A CORPORATION OF OHIO

TUNNEL LINING FOR WITHSTANDING INTERNAL PRESSURE

Application filed February 14, 1931. Serial No. 515,750.

This invention relates generally to tunnel linings for withstanding internal pressure, and more particularly to a splice for connecting the segments of circumferential ribs disposed between and connected to circumferential courses of liner plates in a tunnel lining.

In the accompanying drawings which illustrate two embodiments of my invention,

Figure 1 is a cross section of a tunnel showing the construction of a tunnel lining and embodying a splice for the segments of the circumferential ribs disposed between circumferential courses of liner plates;

Figure 2 is an enlarged cross section of a portion of the lining shown in Figure 1;

Figure 3 is a section taken in a plane corresponding to the line III—III of Figure 2; and Figure 4 is a view similar to Figure 3 but showing a modified form of the invention.

According to the present invention tunnel linings for withstanding internal pressure are made by bolting or riveting together the end flanges of arcuate liner plates so as to form a circumferential course of the plates. In between each of these circumferential courses, or between certain of the courses, are disposed circumferential ribs to which the side flanges of the liner plates are bolted or otherwise secured. The circumferential ribs are made in segments, the ends of adjacent segments being spliced together. A principal feature of the present invention is the provision of a splice which will place the ends of the rib segments under compression and also places the splice bars under tension. By this means any clearance provided in the holes in the splice bars and rib segments is taken up during the construction of the lining and the splice bars are placed under an initial tension so that thereafter when the lining is subjected to internal pressure the lining will not expand and pull away from the concrete with which the metal lining may be lined.

Referring more particularly to the Figures 1 to 3 of the accompanying drawings, the tunnel lining comprises a plurality of arcurate metal liner plates 2 having end flanges 3 and side flanges 4 extending toward the inside of the tunnel. The liner plates 2 are provided with strengthening ribs 5 which extend lengthwise of the liner plates. The liner plates are provided with bolt holes 6 in the side flanges and with bolt holes 7 in the end flanges. The end flanges 3 are secured together by bolts 8 so as to form a circumferential ring or course of liner plates.

In between each of the circumferential courses of liner plates is disposed a circumferential rib 10 illustrated in Figures 1 to 3 as a T-bar. The T-bar is disposed with its flange 11 inside of the tunnel lining. The web 12 of the T-bar is provided with openings through which bolts 13 extend to connect the side flanges 4 of the liner plates. In Figure 1 three T-bar segments 10 are used to form the complete circumferential rib, the joints of the rib segments being indicated by the reference numeral 15.

The ends of the segments 10 are connected by angle splice bars 16 arranged on opposite sides of the web 12 of the rib 10. As shown in Figure 3, the vertical flanges 17 of the angle splice bars 16 are arranged on opposite sides of the web 10, and the splice bars are connected to each other and to the ends of the ribs 10 by means of bolts 18.

In order to place the ends of the rib segments 10 under compression and to place the splice bars 16 under tension so that when the lining is completed it will withstand internal pressure without substantial deformation, the distance between the bolt holes in the splice bars is made slightly less than the distance between corresponding holes in the ribs 10. As an example, the distance between the two holes 20 and 21 in the splice bar 16 may be $3\frac{31}{32}''$, whereas the distance between the corresponding holes in the rib 10 may be $4''$. The distances between the other holes in the splice bars are also made correspondingly less than the distances between corresponding holes in the circumferential ribs.

In making the splice between the ends of rib segments 10, the splice bars 16 are bolted loosely to the end of the first segment 10. The next segment is then brought into position and drift pins are driven into the holes through the splice bars and the segments.

Owing to the spacing of the holes, as described above, this drifting stretches the splice bars, placing them under tension, and compresses the ends of the segments. Thereafter the drifts are driven out one at a time and replaced with bolts. All the bolts are then tightened. After the metal tunnel lining is completed, it may be lined by a concrete lining 23 as indicated in Figure 1.

In the preferred embodiment hereinabove described, the rib segments 10 are T-bars and the splice bars 16 used for joining the ends of the segments are angles. It is preferred to use T-bars for the circumferential ribs since the section modulus of the hole section is greatly increased per pound of steel used owing to the disposal of a large proportion of the section of the steel in a flange at a considerable distance from the steel in the liner plates 2. Angles are preferred for the splice bars since a loss of section due to the holes is not as great as with a flat bar. However, channels, I-beams, angles, H-bars, flat bars or other structural shapes may be used for the circumferential ribs or for the slice bars.

In the embodiment shown in Figure 4, an angle bar 10a is used in place of the T-bar 10 shown in Figure 3, and flat bars 16a are used in place of the angle bar 16. In Figure 4 parts corresponding to the parts shown in Figure 3 are indicated by the same reference numeral with an "a" suffixed.

It will be seen that by placing the splice bars under tension when the tunnel lining is constructed, the lining will withstand internal pressure to which it is thereafter subjected without substantial deformation. Since the metal lining is not substantially deformed when subjected to internal pressure, it will act as a rigid casing for the concrete lining which may be used, thereby decreasing the tendency of the concrete lining to crack.

I have illustrated and described two embodiments of my invention and have particularly described the use of T-bars for the circumferential ribs, and angle bars for forming the splices. It is to be understood, however, that other shapes may be employed and that the invention may be otherwise embodied within the scope of the following claims.

I claim:

1. In a tunnel lining for withstanding internal pressure and comprising circumferential courses of liner plates connected by circumferential rib segments disposed between courses, splicing means for the rib segments, said splicing means having holes initially spaced at a less distance than the distance between corresponding holes in the rib segments, and securing means in the holes in said splicing means and rib segments, said splicing means being under initial tension.

2. A splice for connecting rib segments disposed between and connected to circumferential courses of liner plates in a tunnel lining, said splice comprising a splice bar having holes initially spaced at a less distance than the distance between corresponding holes in the rib segments, and securing means in the holes in the splice bar and segments.

3. A slice for connecting T-bar rib segments disposed between and connected to circumferential courses of liner plates in a tunnel lining with the flange of the T-bar inside of the lining, said splice comprising splice bars arranged on opposite sides of the rib segments and having holes initially spaced at a less distance than the distance between corresponding holes in the rib segments, and bolts in the holes for connecting the splice bars and rib segments.

4. A splice for connecting T-bar rib segments disposed between and connected to circumferential courses of liner plates in a tunnel lining with the flange of the T-bar inside of the lining, said splice comprising angle splice bars arranged on opposite sides of the rib segments and having holes initially spaced at a less distance than the distance between corresponding holes in the rib segments, and bolts in the holes for connecting the splice bars and rib segments.

5. A splice for connecting T-bar rib segments disposed between and connected to circumferential courses of liner plates in a tunnel lining with the flange of the T-bar inside of the lining, said splice comprising splice bars arranged on opposite sides of the web of the rib segments and having holes initially disposed at a less distance than the distance between corresponding holes in the web of the rib segments, and bolts in the holes for connecting the splice bars and rib segments.

6. A splice for connecting T-bar rib segments disposed between and connected to circumferential courses of liner plates in a tunnel lining with the flange of the T-bar inside of the lining, said splice comprising angle splice bars arranged on opposite sides of the web of the rib segments and having holes initially spaced at a less distance than the distance between corresponding holes in the web of the rib segments, and bolts in the holes for connecting the splice bars and rib segments.

7. A splice for connecting rib segments disposed between and connected to circumferential courses of liner plates in a tunnel lining, said splice comprising splice bars arranged on opposite sides of the rib segments and having holes initially spaced at a less distance than the distance between corresponding holes in the rib segments, and bolts in the holes for connecting the splice bars and rib segments.

8. A splice for connecting rib segments disposed between and connected to circumferential courses of liner plates in a tunnel lining, said splice comprising angle splice bars arranged on opposite sides of the rib segments and having holes initially spaced at a less distance than the distance between corresponding holes in the rib segments, and bolts in the holes for connecting the splice bars and rib segments.

9. A splice for connecting angle rib segments disposed between and connected to circumferential courses of liner plates in a tunnel lining with a flange of the segments inside of the lining, said splice comprising splice bars arranged on opposite sides of the flange and having holes initially spaced at a less distance than the distance between corresponding holes in the flange of the angle rib segments, and bolts in the holes for connecting the splice bars and rib segments.

10. A splice for connecting I-beam rib segments disposed between and connected to circumferential courses of liner plates in a tunnel lining, said splice comprising a splice bar having holes initially spaced at a less distance than the distance between corresponding holes in the rib segments, and securing means in the holes in the splice bar and segments.

11. A splice for connecting I-beam rib segments disposed between and connected to circumferential courses of liner plates in a tunnel lining, said splice comprising splice bars arranged on opposite sides of the rib segments and having holes initially spaced at a less distance than the distance between corresponding holes in the rib segments, and securing means in the holes in the splice bars and segments.

12. A splice for connecting channel rib segments disposed between and connected to circumferential courses of liner plates in a tunnel lining, said splice comprising a splice bar having holes initially spaced at a less distance than the distance between corresponding holes in the channel rib segments, and securing means in the holes in the splice bar and segments.

In testimony whereof I have hereunto set my hand.

ROBERT V. PROCTOR.